US008804544B2

(12) United States Patent
Linkola et al.

(10) Patent No.: US 8,804,544 B2
(45) Date of Patent: Aug. 12, 2014

(54) SYSTEM AND METHOD FOR LIMITING ACCESS TO AN IP-BASED WIRELESS TELECOMMUNICATIONS NETWORK BASED ON ACCESS POINT IP ADDRESS AND/OR MAC ADDRESS

(75) Inventors: Janne P. Linkola, Espoo (FI); Christopher E. Caldwell, Woodstock, GA (US)

(73) Assignee: T-Mobile USA, Inc., Bellevue, WA (US)

( * ) Notice: Subject to any disclaimer, the term of this patent is extended or adjusted under 35 U.S.C. 154(b) by 1264 days.

(21) Appl. No.: 12/159,201

(22) PCT Filed: Dec. 27, 2006

(86) PCT No.: PCT/US2006/049341
§ 371 (c)(1),
(2), (4) Date: Mar. 19, 2009

(87) PCT Pub. No.: WO2007/076147
PCT Pub. Date: Jul. 5, 2007

(65) Prior Publication Data
US 2009/0219826 A1 Sep. 3, 2009

Related U.S. Application Data

(60) Provisional application No. 60/754,528, filed on Dec. 27, 2005.

(51) Int. Cl.
*H04L 12/26* (2006.01)
(52) U.S. Cl.
USPC ............ 370/252; 370/331; 370/338; 370/355
(58) Field of Classification Search
USPC ............. 370/252, 331, 338, 335, 332, 342; 455/441, 442, 444, 450, 436, 437
See application file for complete search history.

(56) References Cited

U.S. PATENT DOCUMENTS

| 5,406,615 A | 4/1995 | Miller, II et al. |
| 6,647,426 B2 | 11/2003 | Mohammed |

(Continued)

FOREIGN PATENT DOCUMENTS

| WO | WO-2005041612 | 5/2005 |
| WO | WO-2007076147 | 7/2007 |
| WO | WO-2008140555 | 11/2008 |

OTHER PUBLICATIONS

International Search Report and Written Opinion, International Application No. PCT/US2007/82305, Filed on Oct. 23, 2007, Applicant: T-Mobile USA, Inc., Date of Mailing: Nov. 3, 2008, 10 pages.

(Continued)

*Primary Examiner* — Rasheed Gidado
(74) *Attorney, Agent, or Firm* — Perkins Coie LLP

(57) ABSTRACT

A system and method manages call connections between mobile subscribers and an IP-based wireless telecommunications network through a wireless access point. Communications between the mobile subscribers and the IP-based wireless telecommunications network are initiated by a registration request. During the registration request various identifiers (IMSI, MAC address, IP Address, etc.) are communicated to the system. The system is arranged to log the identifiers and associate those identifiers with the entry point (e.g., the wireless access point) into the IP based wireless network. Call connections from the mobile subscribers are monitored for various throughput and call quality based metrics. Call handoffs between the IP-based wireless communications network and the cellular telephony network are managed by the system based on the monitored call quality and throughput metrics on a per-access point basis using the registered identifiers.

8 Claims, 5 Drawing Sheets

(56) References Cited

U.S. PATENT DOCUMENTS

| | | | |
|---|---|---|---|
| 6,680,923 B1 | 1/2004 | Leon | |
| 6,922,559 B2 | 7/2005 | Mohammed | |
| 6,925,074 B1 | 8/2005 | Vikberg et al. | |
| 7,127,250 B2 | 10/2006 | Gallagher et al. | |
| 7,308,263 B2 | 12/2007 | Gallagher et al. | |
| 7,324,818 B2 | 1/2008 | Gallagher et al. | |
| 7,565,145 B2 | 7/2009 | Gallagher et al. | |
| 2002/0156897 A1* | 10/2002 | Chintalapati et al. | 709/227 |
| 2002/0167933 A1* | 11/2002 | Feli et al. | 370/349 |
| 2002/0197991 A1* | 12/2002 | Anvekar et al. | 455/432 |
| 2003/0114158 A1 | 6/2003 | Soderbacka et al. | |
| 2003/0119490 A1 | 6/2003 | Mohammed | |
| 2003/0176186 A1 | 9/2003 | Mohammed | |
| 2004/0001461 A1 | 1/2004 | Lohtia et al. | |
| 2004/0090958 A1 | 5/2004 | Park et al. | |
| 2004/0095914 A1 | 5/2004 | Katsube et al. | |
| 2004/0105416 A1* | 6/2004 | Rue | 370/338 |
| 2004/0229621 A1 | 11/2004 | Misra | |
| 2005/0018637 A1 | 1/2005 | Karoubalis et al. | |
| 2005/0090259 A1* | 4/2005 | Jain et al. | 455/439 |
| 2005/0221828 A1* | 10/2005 | Wakuta et al. | 455/437 |
| 2005/0271008 A1 | 12/2005 | Gallagher et al. | |
| 2006/0020694 A1 | 1/2006 | Nag et al. | |
| 2006/0058021 A1 | 3/2006 | Fox et al. | |
| 2006/0058032 A1* | 3/2006 | Pearce et al. | 455/444 |
| 2006/0062225 A1 | 3/2006 | Li | |
| 2006/0073826 A1* | 4/2006 | Miernik | 455/435.1 |
| 2006/0098598 A1 | 5/2006 | Gallagher | |
| 2006/0111112 A1* | 5/2006 | Maveddat | 455/439 |
| 2006/0116127 A1* | 6/2006 | Wilhoite et al. | 455/442 |
| 2006/0148479 A1* | 7/2006 | Park et al. | 455/437 |
| 2006/0223498 A1 | 10/2006 | Gallagher et al. | |
| 2006/0268799 A1* | 11/2006 | Huang et al. | 370/338 |
| 2007/0008885 A1* | 1/2007 | Bonner | 370/230 |
| 2007/0091839 A1* | 4/2007 | Abdelhamid et al. | 370/329 |
| 2010/0103831 A1 | 4/2010 | Caldwell et al. | |

OTHER PUBLICATIONS

Ooghe, S. et al., "Supporting Quality of Service in Broadband Access Networks," Alcatel Communications Review, 2nd Quarter 2005, pp. 128-133.

U.S. Appl. No. 10/115,767, filed Apr. 2, 2002, Mohammed.

U.S. Appl. No. 10/116,186, filed Apr. 2, 2002, Mohammed.

U.S. Appl. No. 11/029,947, filed Jan. 4, 2005, Gallagher.

U.S. Appl. No. 11/129,424, filed May 12, 2005, Gallagher.

International Search Report for PCT/US2006/049341; Applicant: T-Mobile USA, Inc.; Date of Mailing: Oct. 11, 2007, 2 pages.

Written Opinion for PCT/US2006/049341; Applicant: T-Mobile USA, Inc.; Date of Mailing: Oct. 11, 2007, 7 pages.

Leggio, Simone et al., "Achieving Seamless Mobility in IP-Based Radio Access Networks," IEEE Wireless Communications, Feb. 2005, pp. 54-59.

Rexhepi, Vlora et al., "Performance of Streaming Services in GERAN A/Gb Mode," Nokia Research Center, IEEE 2004, pp. 4511-4515.

Canada Intellectual Property Office, Examiner's Report, CA Patent Application 2,619,647, mailed May 31, 2012, 3 pages.

European Patent Office, Supplementary European Search Report and Search Opinion, EP06848204.1, mailed Feb. 17, 2012, 7 pages.

* cited by examiner

SYSTEM AND METHOD FOR LIMITING ACCESS TO AN IP-BASED WIRELESS TELECOMMUNICATIONS NETWORK BASED ON ACCESS POINT IP ADDRESS AND/OR MAC ADDRESS

RELATED APPLICATIONS

This application is a U.S. National Stage application of International Application No. PCT/US06/049341, entitled "SYSTEM AND METHOD FOR LIMITING ACCESS TO AN IP-BASED WIRELESS TELECOMMUNICATIONS NETWORK BASED ON ACCESS POINT IP ADDRESS AND/OR MAC ADDRESS," filed on 27 Dec. 2006, as a PCT International Patent Application in the name of T-Mobile, USA, Inc., a U.S. national corporation, applicant for the designation of all countries except the US, and Janne P. Linkola, a citizen of Finland, and Christopher E. Caldwell, a citizen of the U.S., applicants for the designation of the US only, which claims the benefit of U.S. Provisional Patent Application No. 60/754,528, filed Dec. 27, 2005.

FIELD OF THE INVENTION

The present invention relates to a system and method for managing call connections between mobile subscribers and an IP-based wireless telecommunications network through a wireless access point. More specifically, the present invention is related to a method for a system to monitor call connections from mobile subscribers for various throughput and call quality based metrics associated with connections, where each call is identified at least one of a MAC address, an IMSI address, or an IP address, and to manage those calls for handoffs between the IP-based wireless telecommunications network and the cellular telephone network based on the monitored connection.

BACKGROUND

A variety of technologies enable telecommunication services to be offered using Internet Protocol (IP). Commonly referred to as Voice over IP, or VoIP, such technologies enable telecommunications on any public or private IP network, including the Internet. VoIP technology permits a user to receive IP-based telecommunications services through a variety of devices, including a desktop computer, a notebook computer, an analog handset used in conjunction with a VoIP telephone adapter, a VoIP-enabled handset, or other like device.

Increasingly, mobile devices, such as notebook computers, personal digital assistants (PDAs), wireless handhelds, wireless handsets, or other similar devices, are also being enabled to receive IP-based telecommunications services. Such services are provided by enabling the mobile device to communicate with a wireless router and access any IP-based wireless access network, such as a network based on the IEEE 802.16 (WiMAX), IEEE 802.20 Mobile Broadband Wireless Access (MBWA), Ultra Wideband (UWB), 802.11 wireless fidelity (Wi-Fi), and Bluetooth standards.

Moreover, dual-mode mobile telecommunications devices may be enabled to communicate with any IP-based wireless access network. For instance, Unlicensed Mobile Access (UMA) technology allows wireless service providers to merge cellular networks, such as Global System for Mobile Communications (GSM) networks, and IP-based wireless networks into one seamless service with one mobile device, one user interface, and a common set of network services for both voice and data. UMA technology has recently been accepted into release 6 of the 3rd Generation Partnership Project (3GPP) standard as a General Access Network (GAN). With UMA or GAN solutions, subscribers may move between cellular networks and IP-based wireless networks with seamless voice and data session continuity as transparently as they move between cells within the cellular network. Seamless in-call handover between the IP-based wireless network and cellular network ensures that the user's location and mobility do not affect the services delivered to the user. Services may be identical whether connected over the IP-based wireless network or the cellular network. UMA technology effectively creates a parallel radio access network, the UMA network, which interfaces to the mobile core network using standard mobility-enabled interfaces. The mobile core network remains unchanged. The common mobile core network makes it possible for the service provider to have full service and operational transparency. The existing service provider Business Support Systems (BSS), service delivery systems, content services, regulatory compliance systems, and Operation Support Systems (OSS) can support the UMA network without change. Service enhancements and technology evolution of the mobile core network apply transparently to both cellular access and UMA.

The present disclosure has identified a system and method of monitoring various quality of service (QoS) indicators for a mobile subscriber's connection in an IP-based wireless telecommunications network to identify various system bottlenecks during the wireless IP connection registration process and/or during ongoing wireless IP communications. As described in further detail below, mobile subscribers connect to the IP-based wireless telecommunication network through an entry point such as a wireless access point that can be identified by IP Address and/or MAC address. Handoffs and/or call registration refusals are used to control the overall quality level for the IP-based wireless communications that are handled by the identified entry points according to the presently disclosed methodologies.

DETAILED DESCRIPTION

The present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Briefly stated, the present disclosure relates to a system and method for managing call connections between mobile subscribers and an IP-based wireless telecommunications network through a wireless access point. Communications between the mobile subscribers and the IP-based wireless telecommunications network are initiated by a registration request. During the registration request various identifiers (IMSI, MAC address, IP Address, etc.) are communicated to the system. The system is arranged to log the identifiers and associate those identifiers with the entry point (e.g., the wireless access point) into the IP based wireless network. Call connections from the mobile subscribers are monitored for various throughput and call quality based metrics. Call handoffs between the IP-based wireless communications network and the cellular telephony network are managed by the system based on the monitored call quality and throughput metrics on a per-access point basis using the registered identifiers.

Voice Over Internet Protocol (VoIP) Network

Figure 1:
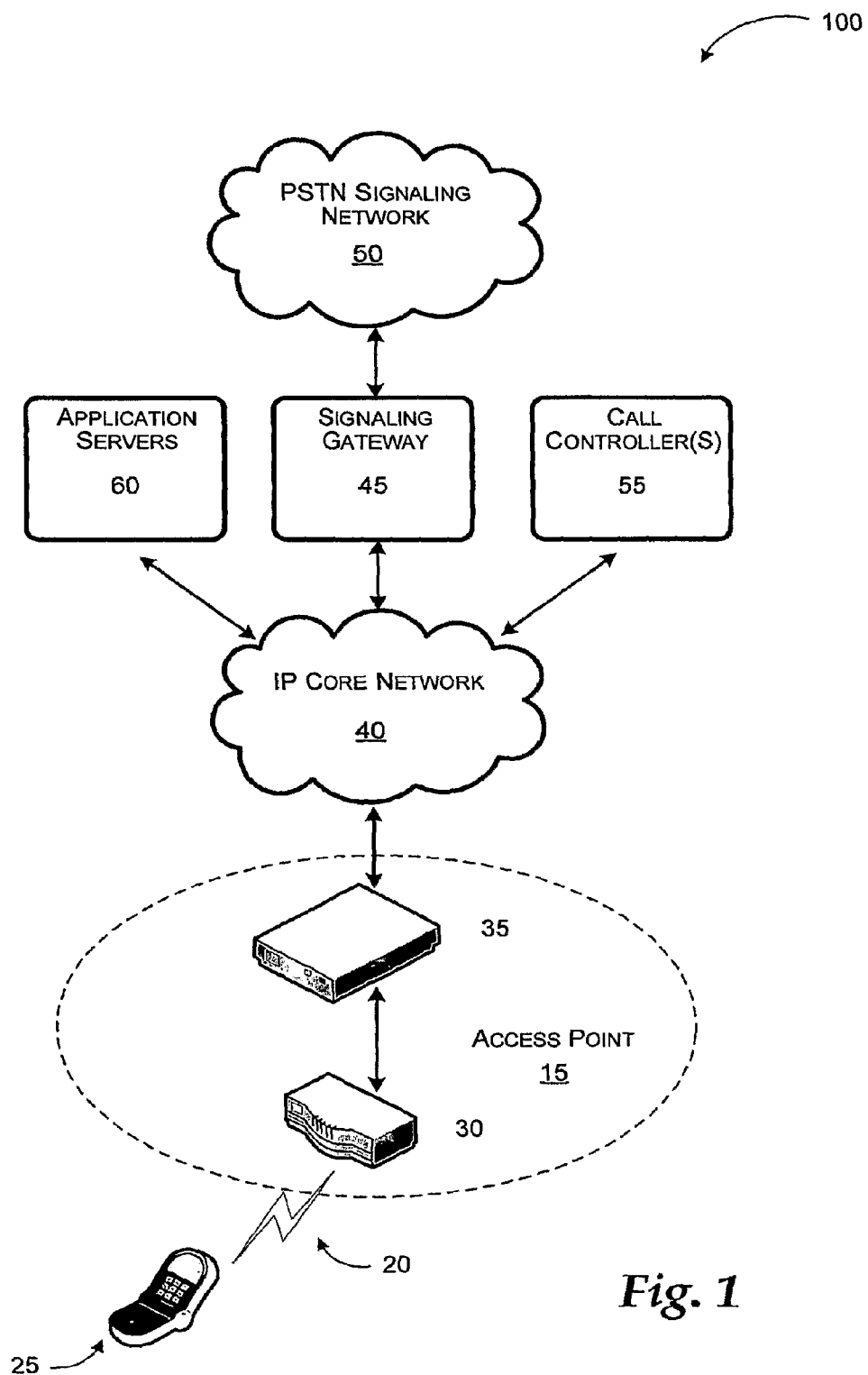
FIG. 1 illustrates an example Voice over IP system

FIG. 1 illustrates the components of a generalized Voice over Internet Protocol (VoIP) system 100 for mobile communication devices. The system comprises one or more access points (APs) 15 that can accept communications 20 from mobile devices 25. The access point includes a wireless router 30 and a broadband modem 35 that enable connection to an Internet Protocol (IP) network 40. IP network 40 may be one or more public networks, private networks, or combination of public and private networks. IP packets that carry communications from the mobile device 25 are received at the access point 15 and transported through the IP network 40 to a signaling gateway 45. Signaling gateway 45 is typically operated by a service provider and converts the VoIP signal to a traditional phone service signal. The phone signal is then conveyed to the intended recipient via a public switched telephone network (PSTN) 50. A call controller 55 that is located in the service provider's network provides communication logic and communication control functions. An application server 60 that is located in the service provider's network provides logic and execution of one or more applications or services that are offered by the server provider, such as implementing various access and security rules.

Converged Cellular and IP-Based Wireless Telecommunications Networks

The VoIP system depicted in FIG. 1 is an architecture that broadly enables any mobile device to receive IP-formatted telecommunication services. One application of that technology is Unlicensed Mobile Access (UMA) technology, which allows cellular service providers to offer their products and services seamlessly over Internet-connected broadband networks. In a converged wireless network, a cellular carrier, such as a GSM or CDMA carrier, may additionally offer wireless telecommunications services over an alternate IP-based wireless telecommunications network, such as the Internet. For instance, Unlicensed Mobile Access (UMA) technology allows cellular service providers to offer their products and services seamlessly over Internet-connected broadband networks. Dual-mode mobile devices may utilize licensed spectrums (such as spectrums for cellular communications) and alternate licensed and unlicensed spectrums (such as spectrums that may be used for IP-based communication). For example, dual-mode cellular phones may access a cellular network, such as a GSM network, or an IP-based wireless network, such as a network based on the IEEE 802.16 (WiMAX), IEEE 802.20 Mobile Broadband Wireless Access (MBWA), Ultra Wideband (UWB), 802.11 wireless fidelity (Wi-Fi), or Bluetooth standards. The IP-based networks may also be accessed via wireless access points that are typically connected to a DSL (Digital Subscriber Line) modem, a cable modem, a satellite modem, or any other broadband Internet connection. Access points may be public or private, and may be located in any appropriate geographical location. Example private access points may be located in a subscriber's home, a corporate location, within the confines of a hotel or some other private or semi-private location. Example public access points can be located in coffee shops, libraries, schools or some other publicly accessible location.

When a dual mode mobile device accesses an IP-based wireless network, information is formatted in its native protocol, such as CDMA or GSM system protocols, and then encapsulated into Internet Protocol (IP) packets, transmitted to the access point, and communicated over the Internet to the cellular service provider's mobile core network. Such transmissions bypass the service provider's existing network of radio towers. Because the same native protocols are used in communications involving IP access points as with traditional radio towers, the cellular service provider maintains a large degree of system compatibility even though using an IP-based network. The systems of the cellular service provider that deliver content and handle mobility may not even need to be aware that a subscriber's mobile device is on an alternate wireless network. The system may instead assume the mobile device is on its native cellular network. The IP network is therefore abstracted with respect to the cellular network, regardless of whether the mobile device connects to the cellular network via a base station (for licensed spectrum access) or a wireless access point (for licensed, semilicensed or unlicensed spectrum access).

A non-exhaustive list of products and services available on IP-based wireless networks includes not only voice services, but also supplementary services like call forwarding and call waiting, text messaging services like SMS, and data-based services like ringtone downloads, game downloads, picture messaging, email and web browsing. Further, since a dual-mode mobile device is connected to an IP network, all manner of data services available over such networks may be provided to the mobile device.

Figure 2A:
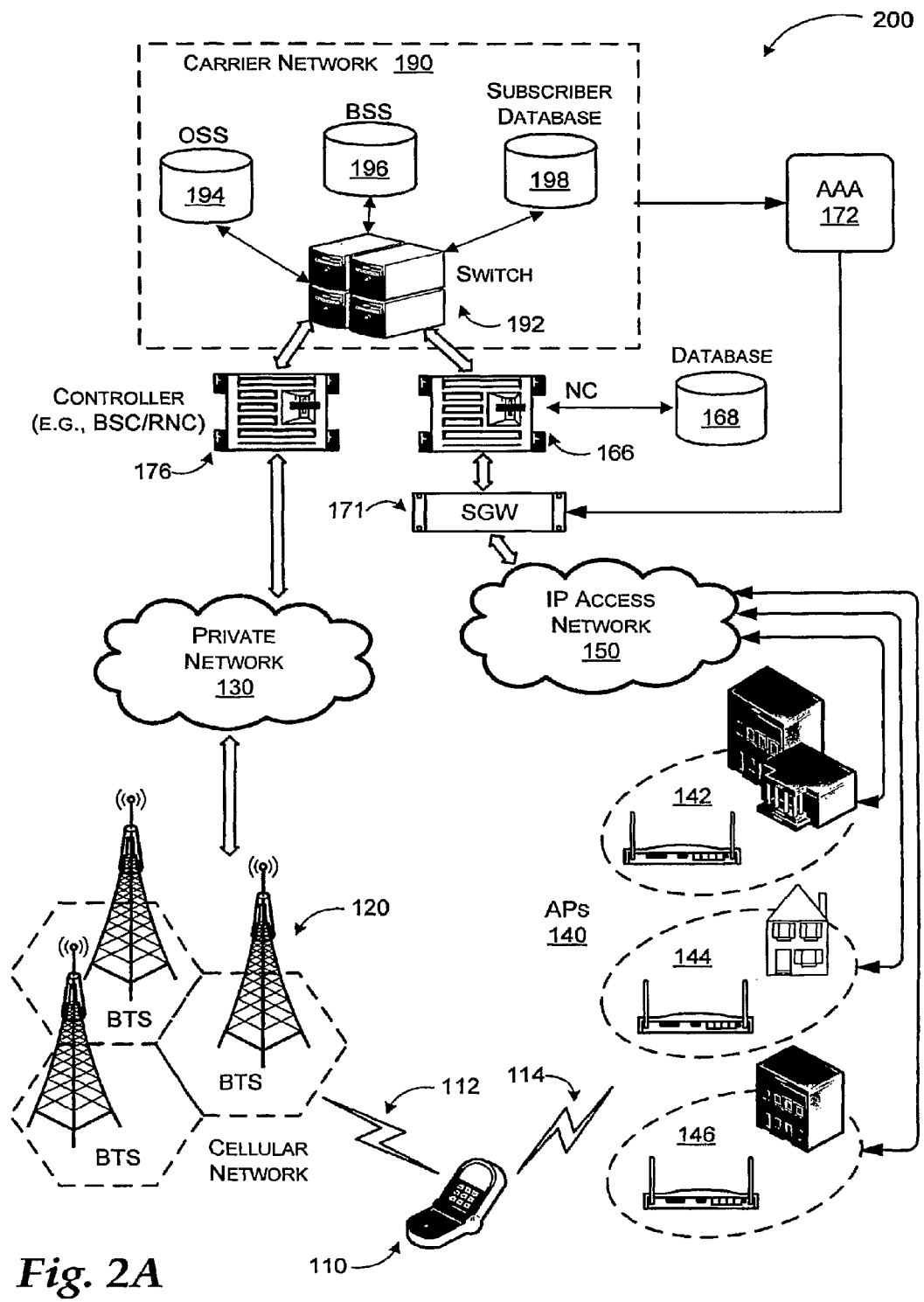
FIG. 2A illustrates example converged wireless networks combining a cellular network with an IP-based access network (in this case, a UMA network).

FIG. 2A is an illustration of a system 200 that combines a cellular telephone network with an IP-based wireless network. The described system 200 accepts registration requests and communication connections from a mobile subscriber (MS) or mobile device 110 to either a cellular telephone network or to an IP-based wireless network.

The example cellular telephone network includes one or more base transceiver stations (BTS) 120 that are configured to accept cellular communications 112 from mobile device 110. The base transceiver stations (BTS) are connected to a base station controller/radio network controller 176 via a private network 130. The private network 130 can include a variety of connections such as T1 lines, a wide area network (WAN), a local area network (LAN), various network switches, and other similar components. Controller 176 controls network communication traffic to the carrier network 190, where all communications are managed. An example carrier network 190 includes a switch 192, which is configured to control data/communication flows, perform load balancing, as well as other functions. A variety of system databases are also accessed in the carrier network such as, e.g., an operation support subsystem (OSS) database 194, a business support system (BSS) database 196, and a subscriber database 198, for billing, communication logging, etc.

The example IP-based wireless network includes one or more access points (APs) 140 that can accept IP communications 114 from mobile device 110. An access point (AP) can be configured as part of a wireless network in one or more locations such as a public network 142, a home network 144, or a private business network 146. Each access point (AP) 140 is coupled to an Internet Protocol (IP) network 150 through a broadband connection. IP packets that carry communications (data, voice, SMS, etc.) are routed from the access points (APs) 140 to a security gateway (SGW) 171 through the IP network 150. The security gateway (SGW) 171 controls access to the network controller 166, which communicates with a database 168 for logging and accessing various data associated with communications. The network controller 166 is also configured to manage access with the carrier network 190 in a similar manner to that performed by the controller 176.

Authentication of a request for access by a mobile device over the IP-based network is handled by the security gateway (SGW) 171, which communicates with an authentication and access authorization (AAA) module 172 as shown in FIG. 2A. Challenges and responses to requests for access by the mobile device are communicated between subscriber database 198 and the AAA module 172. When authorization is granted, the security gateway (SGW) 171 communicates the assignment of an IP address to the mobile device 110 that requested access. Once the IP address is passed to the mobile device 110 by the security gateway (SGW) 171, the public IP address assigned to the device is passed to the network controller 166.

Figure 2B:
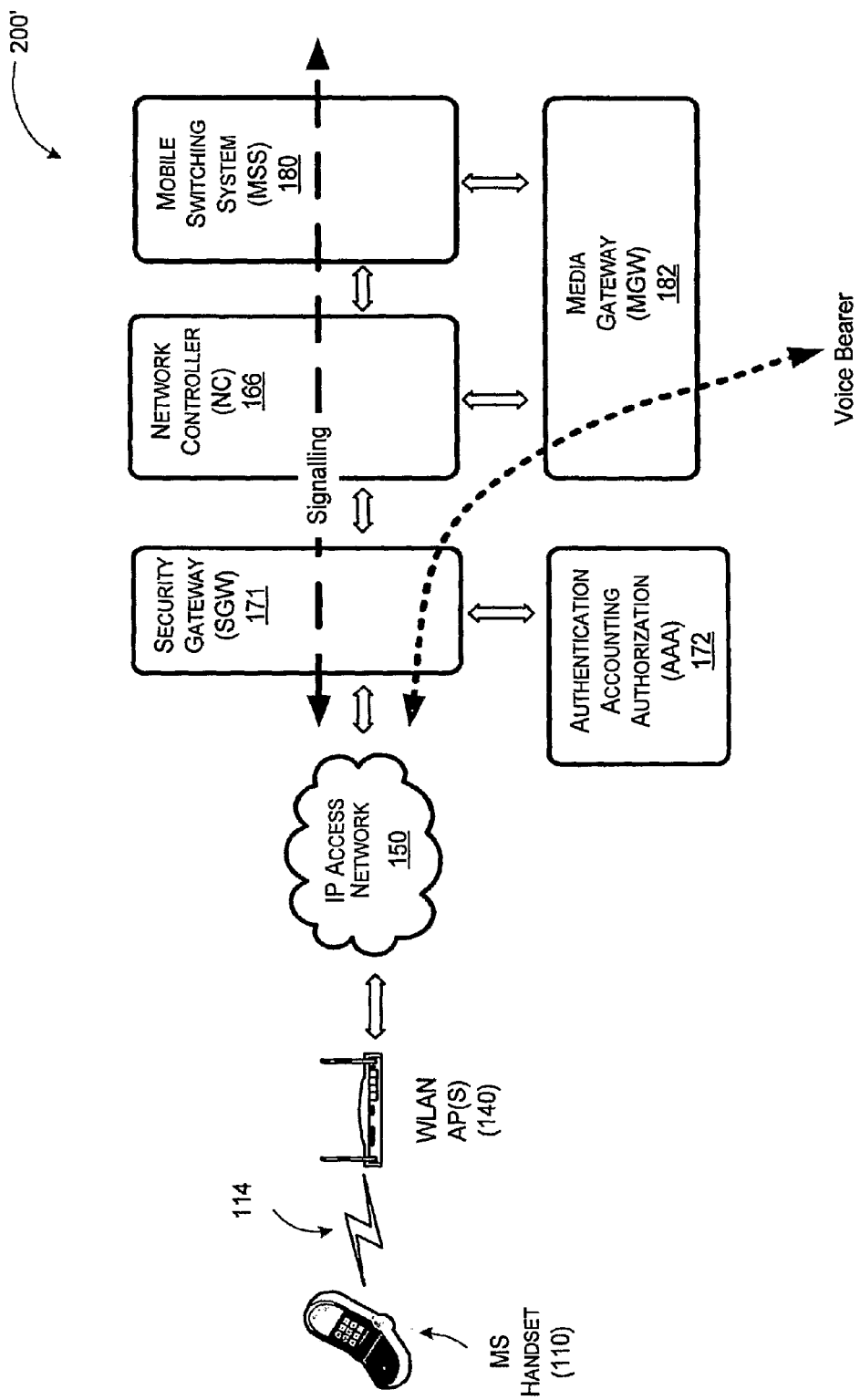
FIG. 2B illustrates another example system that combines a cellular telephone network with an IP-based network (in this case, a UMA network).

FIG. 2B illustrates another example system that combines a cellular telephone network with an IP-based network. The described system 200' accepts registration requests and communication connections from a mobile device 110 to either a cellular telephone network (not shown) or to an IP-based wireless network. The system 200' includes one or more access points (AP) 140 that accept communications 114 from mobile device 110. Each access point (AP) 140 is coupled to an IP network 150 through a broadband connection. IP network 150 routes communications (data, voice, SMS, etc.) between the access points (AP) 140 and a security gateway (SGW) 171. The security gateway (SGW) 171 controls access to the network controller 166, which communicates with a database (not shown) for logging and accessing various data associated with communications. Authentication, access, and authorization are handled by SGW 171 via AAA module 172, as previously described.

For the example system 200', the signaling path of an IP-based communication is routed through the network controller 166 to a mobile switching system (MSS) 180, while the voice bearer path is routed through the network controller 166 to a media gateway (MGW) 182. The signaling portion of a communication governs various overhead aspects of the communication such as, for example, when the communication starts, when the communication stops, initiating a telephone ring, etc. The voice bearer portion of the communication contains the actual content (either data or voice information) of the communication. The media gateway (MGW) 182 controls the content flow between the service provider and the mobile device 110, while the mobile switching system (MSS) 180 controls the signaling flow (or controls overhead-related flow) between the service provider and the mobile device 110.

Network Controller Configuration for IP-Based Wireless Communications

Figure 3:
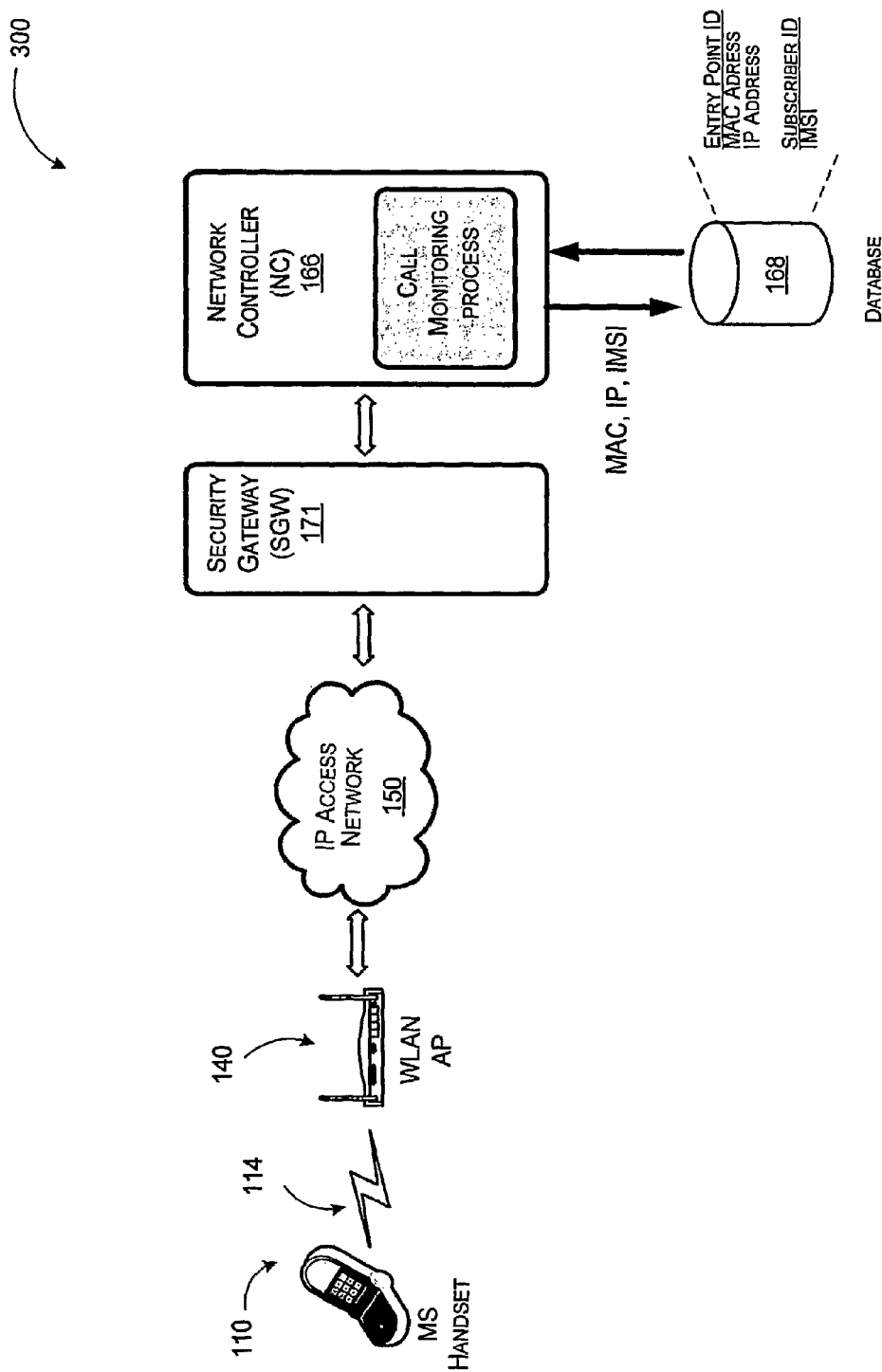
FIG. 3 illustrates an example network controller that is configured in an IP-based wireless telecommunications network for monitoring call quality.

FIG. 3 is an illustration of a network controller configured in a IP-based wireless telecommunications network (300) for monitoring communication quality. A mobile subscriber (MS) handset (110) is arranged to initiate a connection request with a IP-based wireless telecommunications network via a wireless connection (114) to a wireless local area network (WLAN) access point (140). WLAN AP 140 is arranged to communicate with a network controller 166 via an IP access network (150) and a security gateway (171). Network controller 166 is arranged to monitor a variety of communication metrics associated with IP-based wireless communications to evaluate quality of service and to perform management of connections between MS handsets and the IP-based wireless telecommunications network. Network controller 166 is also arranged in communication with a database (168) to log/evaluate connection information associated with the IP-based wireless communications. Example connection information may include a media access control (MAC) address associated with an access point (e.g., WLAN AP 140), an international mobile subscriber identifier (IMSI) associated with mobile subscriber handset (110), and an Internet protocol (IP) address which is provided by the security gateway (SGW 171), to name a few.

IP Address Based Network Access Control for IP-Based Wireless Telecommunications Since the networks associated with VoIP communications are potentially shared among many different services, connection quality will be carefully monitored. For example, a poor user experience may result when an Internet connection is overtaxed. This can be affected by multiple VoIP subscribers and other Internet connected equipment using the same Internet connection. The IP-based wireless telecommunications network perceives all network usage using the same Internet connection as coming from a single IP address.

In some example systems, VoIP-enabled mobile devices are used on private networks that host a numbers of devices such as computers, PDAs, other VoIP phones, and other devices. These private networks share a single Internet connection. To the IP-based wireless telecommunications network, all this usage appears from a single IP address. According to one aspect of the present disclosure; the IP-based wireless telecommunications network is configured to monitor the communication quality and numbers of mobile phones according to their IP address. The IP-based wireless telecommunications network is also configured to determine if communication quality problems are the result of a single access point in the network, multiple access points in the network, or by an overall Internet connectivity problem.

According to an aspect of the present disclosure, the IP-based wireless telecommunications network is configured to simultaneously track connections that are associated with a specific IP address for quality issues. These connections can be from either active communications or communications that are in their idle mode. When quality issues are identified with the connection associated with a specific IP address, the IP-based wireless telecommunications network is arranged to determine if the quality issues are the result of general Internet congestion or by a single access point in the local network. When the local network is causing quality issues with communications, the amount of activity from the identified IP address can be limited by deflecting one or more communications to a cellular or macro network, such as the GSM EDGE Radio Access Network (GERAN), to prevent an undesirable user experience.

Access Point Based Network Access Control for IP-Based Wireless Telecommunications Current Wi-Fi access points (APs) are limited to a fixed number of simultaneous connections due to the nature of the 802.11 communication protocols. The monitored connections from the AP to the mobile subscriber (MS) can be either an active communication or an idle communication. The AP limit for simultaneously active communications may be low (e.g., as low as six subscribers in a conventional AP) due to MAC layer protocols and the RF layer of the AP. Moreover, the AP may also be limited in its capability to handle a large number of packets that are generated by simultaneous active communications, which can result in a data traffic jam.

The IP-based wireless telecommunications network according to the present disclosure is configured to monitor the number of simultaneous active and/or idle communications that are connected through a selected AP. A novel network based solution is described that limits the amount of activity from a selected AP such that undesirable user experiences are minimized.

A variety of quality of service metrics associated with the AP can be monitored to determine an appropriate number of active or idle connections that can be maintained by the access point. When a threshold is reached for an excessive number of active communications, one or more of the active communications are moved to the cellular network (e.g., GERAN) to prevent an undesirable user experience. Similarly, an idle communication can be moved to the cellular network to prevent an undesirable user experience when another threshold is reached for idle communications. Once the resources associated with the AP are released from the transferred communications, the AP is unloaded sufficient that the acceptable communication quality is restored.

Media Access Control (MAC) addresses are 12 character hexadecimal values that are assigned to networking equipment such as wireless network or Wi-Fi access points (AP). Typically, the first hexadecimal characters in the MAC address identify the manufacturer of the networking equipment, while the remaining hexadecimal characters are serialized numbers that make each MAC address unique.

A mobile subscriber (MS) cannot generally access network services until after the MS device is registered in the IP-based wireless telecommunications network. During the registration process, the MS registration request includes the MAC address of the AP. The IP-based wireless telecommunications network can evaluate the MAC address in the registration request to determine the number of users that are connected to the AP for a communication.

Process Flow

Figure 4:
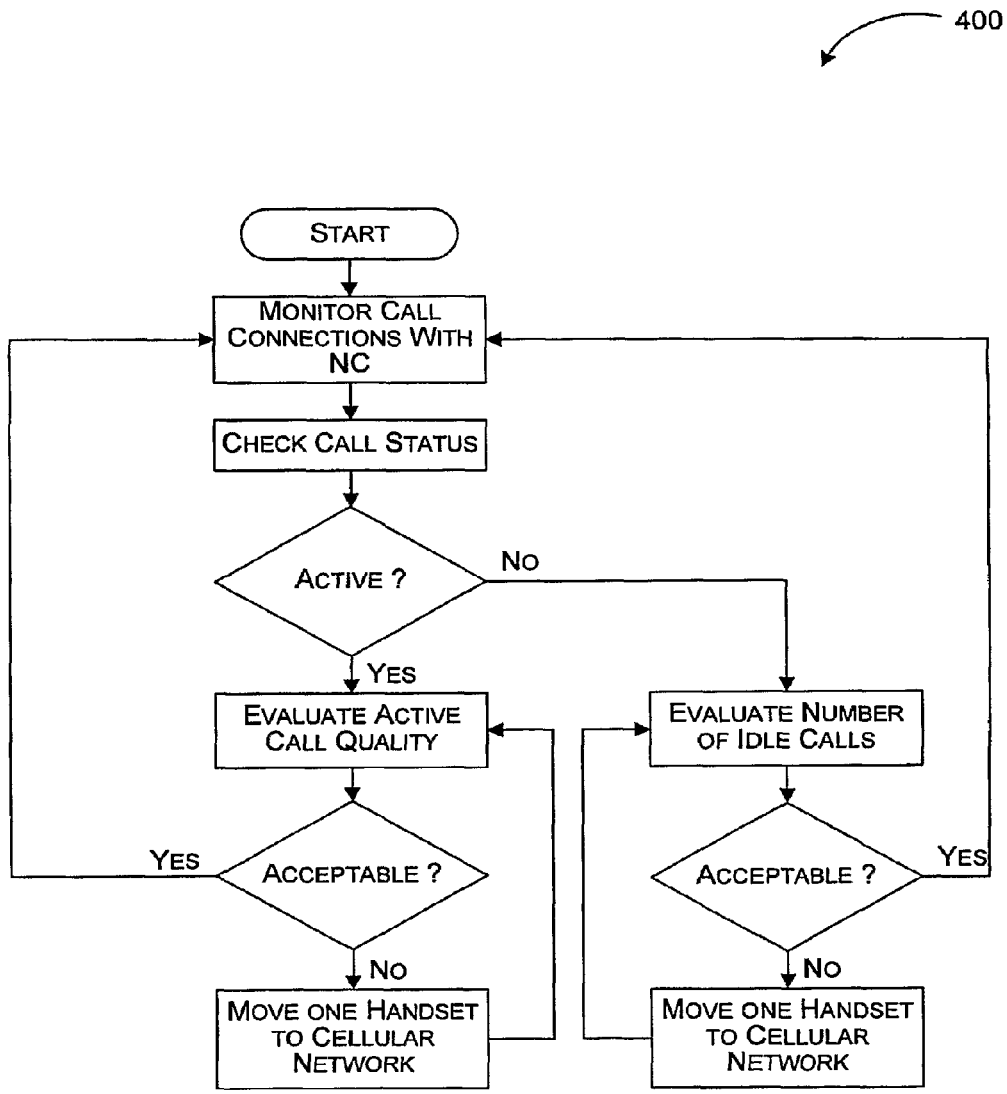
FIG. 4 illustrates a logic flow diagram for a process of evaluating calls from dual-mode handsets in a network controller to provide handoffs to a cellular network to ensure quality.

FIG. 4 illustrates a logic flow diagram (400) for a process of evaluating communications from VoIP-enabled handsets in a network controller to provide handoffs to a cellular network (e.g., GERAN) to ensure quality. Call connections are monitored with the network controller to determine a status associated with each connection as either active (e.g., a IP-based wireless communication in progress), or idle.

The communication quality associated with each active communication is evaluated to determine if they are acceptable. When the communication quality for an active communication is unacceptable, an active communication MS handset is moved off of the IP-based wireless telecommunications network to another network such as a cellular network (e.g., a GSM Edge Radio Network (GERAN), 2.5 G, 3 G, etc.) using a handoff. Additional active communication MS handsets will also be handed-off to the cellular network until an acceptable communication quality level is achieved.

The total number of idle communications is evaluated to determine if it has exceeded a threshold limit. When the total number of idle communications are not acceptable (i.e., they have exceeded the threshold limit), an idle communication MS handset is moved off of the IP-based wireless telecommunications network to another network such as a cellular network using a handoff. Additional idle communication MS handsets will also be handed-off to the cellular network until an acceptable communication quality level is achieved.

The network controller can monitor multiple MS handsets that originate from the same IP address, or from the same AP MAC address. Call quality can be monitored by the network controller by evaluating a downlink quality indicator on the signaling and the uplink quality at the media gateway. The network controller can communicate a message back to the MS handset indicating that there is communication quality problem. When the communication quality problem persists, the network controller can proceed with a handoff. The handoff can be delayed by having a time delay window to determine if the communication quality improves, or the network controller can first attempt to adjust other communication performance features such as sampling rates, and codec modes, to exhaust other remedies. When the communication quality improves, the network controller can communicate a message to the MS handset indicating that the quality is acceptable. The network controller database tracks each communication, whether idle or active, the IP address associated with the communication, and the MAC address associated with the communication.

The present disclosure is not limited to the above-described environment. Many other configurations of computing devices, communications, applications, and distribution systems may be employed to implement a system for monitoring communication quality metrics based on the IP address and the AP to ensure acceptable quality for VoIP communications.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for ensuring communication quality for a mobile subscriber (MS) on an IP-based wireless telecommunications network, the method comprising:

monitoring communication connections associated with each communication from the mobile subscriber (MS) that is managed in the IP-based wireless telecommunications network,
wherein the IP-based wireless telecommunications network has an IP-core;

identifying an entry point that is associated with the communication connection of each MS in the IP-based wireless telecommunications network,
wherein the entry point is identified by at least one of a Media Access Control (MAC) address and an Internet Protocol (IP) address;

determining a communication quality for active communications that are associated with the entry point;

determining a number of idle communications that are identified with the entry point; and handing off, by the IP-based wireless telecommunications network, at least one monitored active communication associated with the entry point when the determined communication quality for active communications is unacceptable; and handing off, by the IP-based wireless telecommunications network, at least one monitored idle communication associated with the entry point when the determined number of idle communications reaches a threshold limit, whereby the communication quality for each communication that is managed in the IP-based wireless telecommunications network is improved.

2. The computer-implemented method of claim 1, further comprising:

logging each communication connection according to an International Mobile Subscriber Identifier (IMSI) associated with mobile subscriber MS and the entry point identifier.

3. The computer-implemented method of claim 1, further comprising:

dynamically adjusting the threshold limit.

4. The computer-implemented method of claim 1, wherein determining the communication quality comprises evaluating at least one of: a downlink quality and an uplink quality.

5. The computer-implemented method of claim 1, further comprising:

adjusting a performance feature associated with at least one MS, and reevaluating the communication quality associated with the entry point after adjusting the performance feature.

6. The computer-implemented method of claim 1, further comprising:

waiting for a predetermined time interval, and reevaluating the communication quality associated with the entry point after the predetermined time interval has expired.

7. At least one non-transitory, tangible, computer-readable medium that, when executed by at least one data processing device, causes an IP-based wireless telecommunications device to perform a method comprising:

monitoring communication connections associated with each communication from the mobile subscriber (MS) that is managed in the IP-based wireless telecommunications network, wherein the IP-based wireless telecommunications network has an IP-core;

identifying an entry point that is associated with the communication connection of each MS in the IP-based wireless telecommunications network, wherein the entry point is identified by at least one of a Media Access Control (MAC) address and an Internet Protocol (IP) address;

determining a communication quality for active communications that are associated with the entry point;

determining a number of idle communications that are identified with the entry point; and handing off, by the IP-based wireless telecommunications network, at least one monitored active communication associated with the entry point when the determined communication quality for active communications is unacceptable; and handing off, by the IP-based wireless telecommunications network, at least one monitored idle communication associated with the entry point when the determined number of idle communications reaches a threshold limit, whereby the communication quality for each communication that is managed in the IP-based wireless telecommunications network is improved.

8. A IP-based wireless telecommunications device, comprising:

a processor; and a storage device having instructions that when executed by the processor, causes the IP-based wireless telecommunications device to:

monitor communication connections associated with each communication from the mobile subscriber (MS) that is managed in the IP-based wireless telecommunications network, wherein the IP-based wireless telecommunications network has an IP-core;

identify an entry point that is associated with the communication connection of each MS in the IP-based wireless telecommunications network, wherein the entry point is identified by at least one of a Media Access Control (MAC) address and an Internet Protocol (IP) address;

determine a communication quality for active communications that are associated with the entry point;

determine a number of idle communications that are identified with the entry point; and hand off, by the IP-based wireless telecommunications network, at least one monitored active communication associated with the entry point when the determined communication quality for active communications is unacceptable; and hand off, by the IP-based wireless telecommunications network, at least one monitored idle communication associated with the entry point when the determined number of idle communications reaches a threshold limit, whereby the communication quality for each communication that is managed in the IP-based wireless telecommunications network is improved.

* * * * *